(12) United States Patent
Rune et al.

(10) Patent No.: US 7,031,707 B1
(45) Date of Patent: Apr. 18, 2006

(54) SUPPORT FOR FEATURES ASSOCIATED WITH A SUBSCRIBER IN NETWORKS WITH A GATEWAY LOCATION REGISTER

(75) Inventors: Johan Rune, Lidingö (SE); Yun Chao Hu, Lidingö (SE); Juan Noguera-Rodriguez, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/453,908

(22) Filed: Apr. 12, 2000

Related U.S. Application Data

(60) Provisional application No. 60/128,786, filed on Apr. 12, 1999.

(51) Int. Cl.
*H04B 1/38* (2006.01)

(52) U.S. Cl. .................. 455/433; 455/439; 455/560; 370/352; 370/401

(58) Field of Classification Search ........... 455/432.1, 455/433, 435.1, 436, 439, 445, 446, 403, 455/414.1, 560, 561; 370/331, 352, 354, 370/401
See application file for complete search history.

(56) References Cited

U.S. PATENT DOCUMENTS

| | | | |
|---|---|---|---|
| 5,610,974 A | | 3/1997 | Lantto |
| 5,884,169 A | * | 3/1999 | Uchiyama et al. ........... 455/433 |
| 6,002,931 A | * | 12/1999 | Yamaguchi et al. ......... 455/433 |
| 6,137,791 A | * | 10/2000 | Frid et al. .................... 370/352 |
| 6,212,390 B1 | * | 4/2001 | Rune ........................ 455/456.6 |
| 6,311,055 B1 | * | 10/2001 | Boltz ....................... 455/414.1 |
| 6,389,283 B1 | * | 5/2002 | Sanchez Herrero ......... 455/433 |
| 6,529,490 B1 | * | 3/2003 | Oh et al. .................... 370/331 |
| 6,545,987 B1 | * | 4/2003 | Becher ....................... 370/328 |
| 6,556,820 B1 | * | 4/2003 | Le et al. .................... 455/411 |
| 6,731,621 B1 | * | 5/2004 | Mizutani et al. ............ 370/338 |

FOREIGN PATENT DOCUMENTS

| | | |
|---|---|---|
| DE | 196 40 288 A1 | 4/1998 |
| WO | 94/21090 WO | 9/1994 |

OTHER PUBLICATIONS

S. Chen et al.: "Fault Tolerance of PCS Mobility Databases"; Proceedings of the International Conference On Computer Communications and Networks, Sep. 22, 1997, IEEE, XP002061518 pp., 542-547.

"Procedure for Restoration of HLR", European Telecommunication Standard, vol. GSM 9.02, No. Version 3.8.0, 1991, p. 275, ETSI, XP000652720.

(Continued)

*Primary Examiner*—Quochien B. Vuong
*Assistant Examiner*—Thuan Nguyen

(57) ABSTRACT

A method and apparatus for providing an indication, in a system which uses a gateway location register to reduce signaling between visitor location registers and home location registers, to a home location register of the features not supported by a visitor location register. The indication of the features not supported by the visitor location register can be provided to the home location register during a location update message exchange or a data restoration request message exchange. The indication can also be provided in an information update message.

26 Claims, 10 Drawing Sheets

OTHER PUBLICATIONS

Yasuyuki Uchiyama et al.: "Network Functions and Signals for Personal Roaming Between Digital Cellular Standards"; NTT Mobile Communications Network Inc., Apr. 1995, 1995 Fourth IEEE International Conference On Universal Personal Communications Record Meiji Kinenkan, Tokyo, Japan Nov. 6-10, 1995, pp. 447-451.

PCT International Search Report dated May 10, 2001.
PCT International Search Report dated Jul. 27, 2000.
TS GSM 09.02, "Digital Cellular Telecommunications System (Phase 2+) Mobile Application Part (MAP) Specification", from ETSI, Mar. 12, 1999, pp. 472-475.

* cited by examiner

SUPPORT FOR FEATURES ASSOCIATED WITH A SUBSCRIBER IN NETWORKS WITH A GATEWAY LOCATION REGISTER

CROSS-REFERENCE TO RELATED APPLICATIONS

Referenced-Applications

This application claims priority under 35 U.S.C. §§119 and/or 365 to U.S. Provisional Application No. 60/128,786 filed on Apr. 12, 1999, the entire content of which is hereby incorporated by reference. This application is also related to the following co-pending applications filed on Apr. 12, 2000: U.S. patent application Ser. No. 09/453,906 "Home Location Register Fault Recovery"; U.S. patent application Ser. No. 09/453,907 "Gateway Location Register Fault Recovery"; and U.S. patent application Ser. No. 09/547,991 "Gateway Location Registers In A UMTS System", all of which are herein expressly incorporated by reference.

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art
Not Applicable
2. Field of the Invention

The present invention relates to mobile communications systems, and more specifically, to addressing the situation when features associated with a roaming mobile subscriber are not supported by the serving location register in a visited network.

FIG. 1 illustrates a wireless communication system in accordance with the Global System for Mobile communication (GSM) standard. The GSM standard is designed to provide a uniform interface which allows mobile communication subscribers of various countries to operate their mobile devices regardless of the current location of the mobile subscriber. A mobile subscriber typically has a subscription with a network which is designated as the mobile subscriber's home public land mobile network 110 (HPLMN). The HPLMN 110 has a home location register (HLR) 115 which contains, among other things, various information regarding the services provided to the mobile subscriber. When a mobile subscriber roams into a different network, which is referred to as a visited public land mobile network 120 (VPLMN), the VPLMN requires certain data regarding the mobile subscriber's subscription. The data regarding the mobile subscriber's subscription is also known as the mobile subscriber's profile. The mobile subscriber's profile is transferred from the HLR to a visitor location register (VLR) in the VPLMN 120.

In a GSM system mobile subscriber data is stored within the VLR that is associated with the mobile services switching center (MSC) that currently serves the mobile subscriber in order to reduce internetwork signaling between VLRs and HLRs. The decentralization of the VLRs within a GSM system (i.e., each MSC being equipped with a VLR) reduces intranetwork signaling as well. So, for example, if the mobile subscriber is roaming in an area of the VPLMN 120 which is controlled by the MSC/VLR 130, the HLR 115 will transfer the mobile subscriber's profile to MSC/VLR 130. Similarly, if the mobile subscriber is roaming in an area controlled by MSCNLR 135, the HLR 115 will transfer the mobile subscriber's profile to MSC/VLR 135. Although FIG. 1 illustrates the MSC/VLR as a single system node, one skilled in the art will recognize that the MSC and VLR can be implemented as separate system elements.

To increase the compatibility of GSM with other types of systems, it is anticipated that future versions of the GSM standard, also called Universal Mobile Telecommunications System (UMTS), will incorporate elements of other mobile communications systems. For example, the Japanese Personal Digital Cellular (PDC) system includes a system node which is used to reduce internetwork signaling known as a gateway location register (GLR). FIG. 2 illustrates an exemplary mobile communications system in accordance with the PDC system. Like a GSM system, a home network 210 includes an HLR 215 which contains the mobile subscriber's profile. When a mobile subscriber roams into a visited network 220 the mobile subscriber's profile is transferred to GLR 225. In GSM terms, the GLR can be described as a VLR for all subscribers roaming from other networks. Hence, only one GLR is needed for each network.

FIG. 3 illustrates an exemplary UMTS system which incorporates the GLR of the PDC system. When a mobile subscriber of HPLMN 310 roams into VPLMN 320, the HLR 315 will transfer the mobile subscriber's profile to GLR 325. Then, depending upon which area within the VPLMN 320 the mobile subscriber is roaming, the GLR 325 will transfer the mobile subscriber's profile to the respective MSC/VLR 330, 335 or 340. The introduction of the GLR 325 into a GSM/UMTS system reduces internetwork signaling because once the mobile subscriber roams into VPLMN 320, the HLR will only need to transfer the mobile subscriber's profile to GLR 325. GLR 325 will be responsible for transferring the mobile subscriber's profile to the proper MSC/VLR within VPLMN 320 as the mobile subscriber travels around the VPLMN 320.

The protocol used by GSM/UMTS systems for transferring data between VLRs and HLRs is the mobile application part (MAP). Since GLRs are optional elements within the UMTS system, MAP procedures should be completely independent of the presence or absence of GLRs in a system. Accordingly, by using an HLR interface towards the VLRs and a VLR interface towards the HLRs, the GLR should be completely transparent. However, in a system which includes a GLR where the different MSC/VLR nodes support different sets of supplementary services, the indications of this to the HLR in the home network becomes a problem. A similar problem occurs if some MSC/VLR nodes support regional subscription restrictions while others do not, or if different MSC/VLR nodes support different phases of customized applications for mobile network enhanced logic (CAMEL). CAMEL allows wireless systems to provide intelligent network services similar to those provided by wired networks such as the public switched telephone network. The same kind of problem is applicable when different bearer services and teleservices are supported, and when the support for operator determined barring varies between different MSC/VLR nodes. A similar problem occurs when the entire MSC area is restricted for a certain mobile subscriber for some MSC/VLRs but not restricted for other MSC/VLRs. For ease of explanation supplementary services, support for regional subscription restrictions, support for different phases of CAMEL, bearer services and teleservices are referred to herein as features.

FIG. 4 illustrates an exemplary signaling diagram of conventional MAP procedures for handling the situation when a serving MSC/VLR does not support at least one of the features associated with a subscriber. When a mobile subscriber enters an area controlled by an MSC/VLR, the mobile subscriber's device will send a location update request to the serving MSC/VLR. The serving MSC/VLR will then send a MAP_UPDATE_LOCATION message to the HLR associated with the roaming mobile subscriber. Triggered by the MAP_UPDATE_LOCATION message from the serving MSC/VLR the mobile subscriber's HLR initiates the framed MAP_INSERT_SUBSCRIBER_DATA procedure to transfer relevant mobile subscriber data to the serving MSC/VLR.

FIG. 5 illustrates a portion of an exemplary MAP_INSERT_SUBSCRIBER_DATA message which is sent from the HLR to the serving MSC/VLR. The MAP_INSERT_SUBSCRIBER_DATA message includes the SS Data List parameter 505, which indicates the set of supplementary services that are subscriber to by the concerned mobile subscriber, as well as provides necessary data for these supplementary services. If regional subscription restrictions apply for the concerned mobile subscriber, this is indicated in the Regional Subscription Data parameter 510. The MAP_INSERT_SUBSCRIBER_DATA message from the HLR also includes a Bearer Service List parameter 515 and Teleservice List parameter 520 indicating the bearer services and the teleservices that are subscribed to by the concerned mobile subscriber. If operator determined barring applies to the concerned mobile subscriber, this is indicated in the Operator Determined Barring General Data parameter 525, provided that the Subscriber Status parameter in the MAP_INSERT_SUBSCRIBER_DATA message (not illustrated) is set to "Operator Determined Barring". The MAP_INSERT_SUBSCRIBER_DATA message implicitly indicates the CAMEL phases required by the mobile subscriber's subscription by the presence or absence of the CAMEL capability handling information element in the optional capability set I (O-CSI) information element in the VLR CAMEL subscription Information parameter (not illustrated). The presence of the CAMEL capability handling information element indicates CAMEL phase 2 or higher is subscribed to by the mobile subscriber while the absence of the information element indicates that CAMEL phase 1 is subscribed to by the mobile subscriber.

Referring again to FIG. 4, the MSC/VLR determines whether the features associated with the parameters set in the MAP_INSERT_SUBSCRIBER_DATA message are supported by the MSC/VLR and sends a MAP_INSERT_SUBSCRIBER_DATA response message to the HLR.

FIG. 6 illustrates a portion of an exemplary MAP_INSERT_SUBSCRIBER_DATA response message. If any of the indicated supplementary services are not supported by the serving MSC/VLR, these supplementary services are indicated in the SS-Code List parameter 605. If regional subscription restrictions are not supported by the MSC/VLR or if the entire MSC area of the serving MSC is restricted by the regional subscription restrictions (thereby making the mobile subscriber unreachable) or if the parameter contains formatting errors or other data errors, the Regional Subscription Response parameter 610 is included in the MAP_INSERT_SUBSCRIBER_DATA response message indicating the cause of the problem. If either of the indicated bearer services or teleservices are not supported by the MSC/VLR, this is indicated in the Bearer Service List parameter 615 or the Teleservice List parameter 620, respectively. If the mobile subscriber is subject to barring not supported/not allocated by the MSC/VLR, this is indicated in the Operator Determined Barring parameter 625 in the MAP_INSERT_SUBSCRIBER_DATA response message to the HLR. Also included in the MAP_INSERT_SUBSCRIBER_DATA response message from the MSC/VLR to the HLR is the Supported CAMEL Phases parameter 630, indicating the CAMEL phases supported by the MSC/VLR.

Referring again to FIG. 4, the location update procedure is completed by the HLR sending a MAP_UPDATE_LOCATION response confirmation message.

FIG. 7 illustrates signaling in a UMTS system when a mobile subscriber moves from an area controlled by one MSC/VLR to an area controlled by another MSC/VLR in a VPLMN which uses a GLR. When the mobile subscriber, who is not yet registered in the GLR (i.e., not yet registered in the VPLMN) enters an area served by MSC/VLR1 the mobile subscriber's device sends a location update message (not illustrated) to the MSC/VLR1 requesting support. MSC/VLR1 sends a MAP_UPDATE_LOCATION message to the GLR of the VPLMN. Since the mobile subscriber is registering for the first time from this particular VPLMN, the GLR forwards the MAP_UPDATE_LOCATION message to the HLR associated with the mobile subscriber. In response the HLR sends a MAP_INSERT_SUBSCRIBER_DATA message to the GLR indicating features currently subscribed to by and/or applied to the mobile subscriber. This message is forwarded by the GLR to the serving MSC/VLR1 which returns a MAP_INSERT_SUBSCRIBER_DATA response message which is forwarded by the GLR to the HLR. The MAP_INSERT_SUBSCRIBER_DATA response message contains the indications of the features subscribed to by and/or applied to the subscriber which are not supported by this particular serving MSC/VLR. The location updating procedure is completed by the HLR sending a MAP_UPDATE_LOCATION response message to the GLR, which in turn, forwards the message to MSC/VLR1.

To reduce internetwork signaling, when a GLR is used in the visited network, a MAP_UPDATE_LOCATION message is sent to the HLR of a roaming mobile subscriber only upon the first location update request of a series of consecutive location update requests from the roaming mobile subscriber in the particular visited network. Accordingly, when the mobile subscriber subsequently moves to other MSC areas or other serving MSC/VLRs, the HLR is not informed of this move. Instead the MSC/VLR, such as MSC/VLR2, will send a MAP_UPDATE_LOCATION message to the GLR. The GLR will respond with a MAP_INSERT_SUBSCRIBER_DATA message to MSC/VLR2. MSC/VLR2 returns a MAP_INSERT_SUBSCRIBER_DATA response message. The GLR completes the location updating procedure by sending a MAP_UPDATE_LOCATION response message to MSC/VLR2 and performing a location cancellation procedure with MSC/VLR1. Accordingly, if MSC/VLR2 supports different features than those supported by MSC/VLR1, the HLR, which needs to have this information to provide such features, is not informed, since the location update messages are not forwarded by the GLR to the HLR.

BRIEF SUMMARY OF THE INVENTION

According to exemplary embodiments of the present invention, methods and apparatus are provided for indicating features not supported by a visitor location register. A message including an indication of a feature not supported by a visitor location register for a subscriber is sent from a gateway location register to a home location register. Another message including another indication of a feature not supported by another visitor location register for the subscriber is sent to the gateway location register. The gateway location register determines whether a feature is supported by the visitor location register which is not supported by the another visitor location register or whether a feature is supported by the another visitor location register which is not supported by the visitor location register.

According to another aspect of the present invention, a location updating message indicating that a subscriber is being served by the visitor location register is sent from a visitor location register to a gateway location register. Which of the subscriber's features are supported by the visitor location register is indicated to the gateway location register. The message indicating which of the subscriber's features are supported by the visitor location register is sent to the subscriber's home location register. Another location updating message indicating that the subscriber is being served by the another visitor location register is sent from another visitor location register to the gateway location register. Which of the subscriber's features are supported by the another visitor location register is indicated to the gateway location register. The gateway location register determines whether the visitor location register supports features which are not supported by the another visitor location register or whether the another visitor location register supports features which are not supported by the visitor location register.

BRIEF DESCRIPTION OF THE SEVERAL VIEWS OF THE DRAWINGS

The present invention will now be described with reference to the accompanying drawings in which.

DETAILED DESCRIPTION OF THE INVENTION

Figure 1:
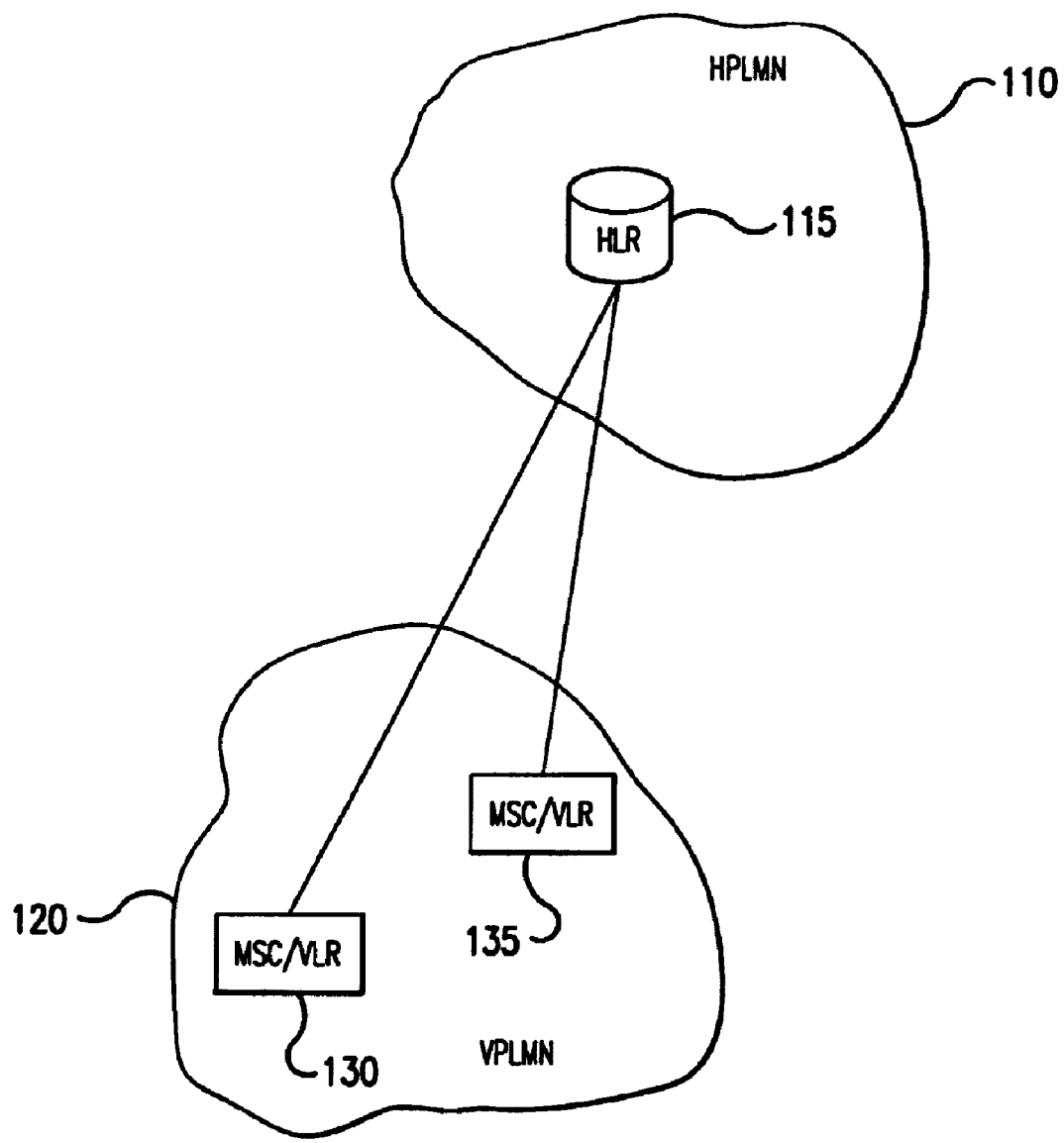
FIG. 1 illustrates a conventional GSM system.
Figure 2:
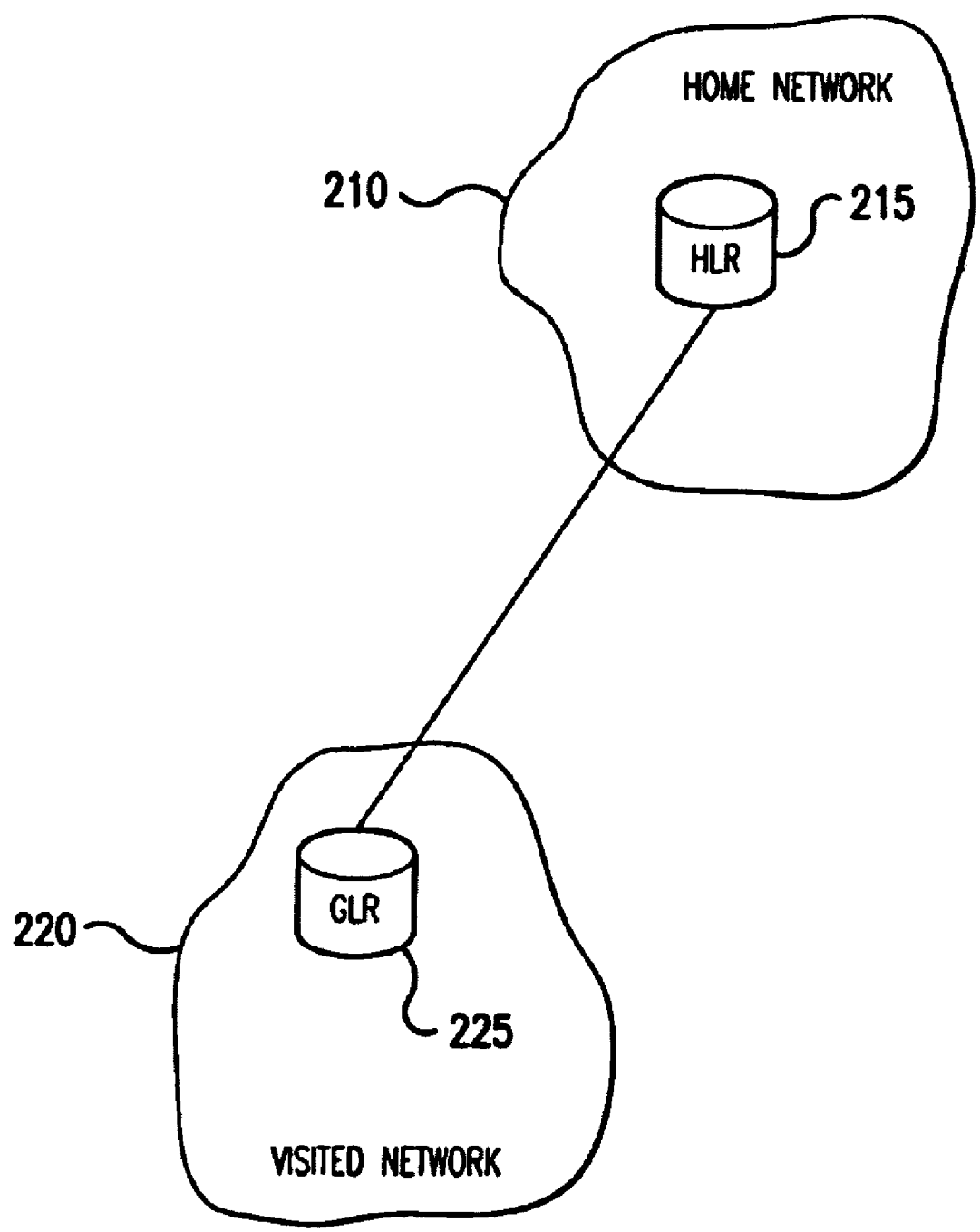
FIG. 2 illustrates a conventional PDC system.
Figure 3:
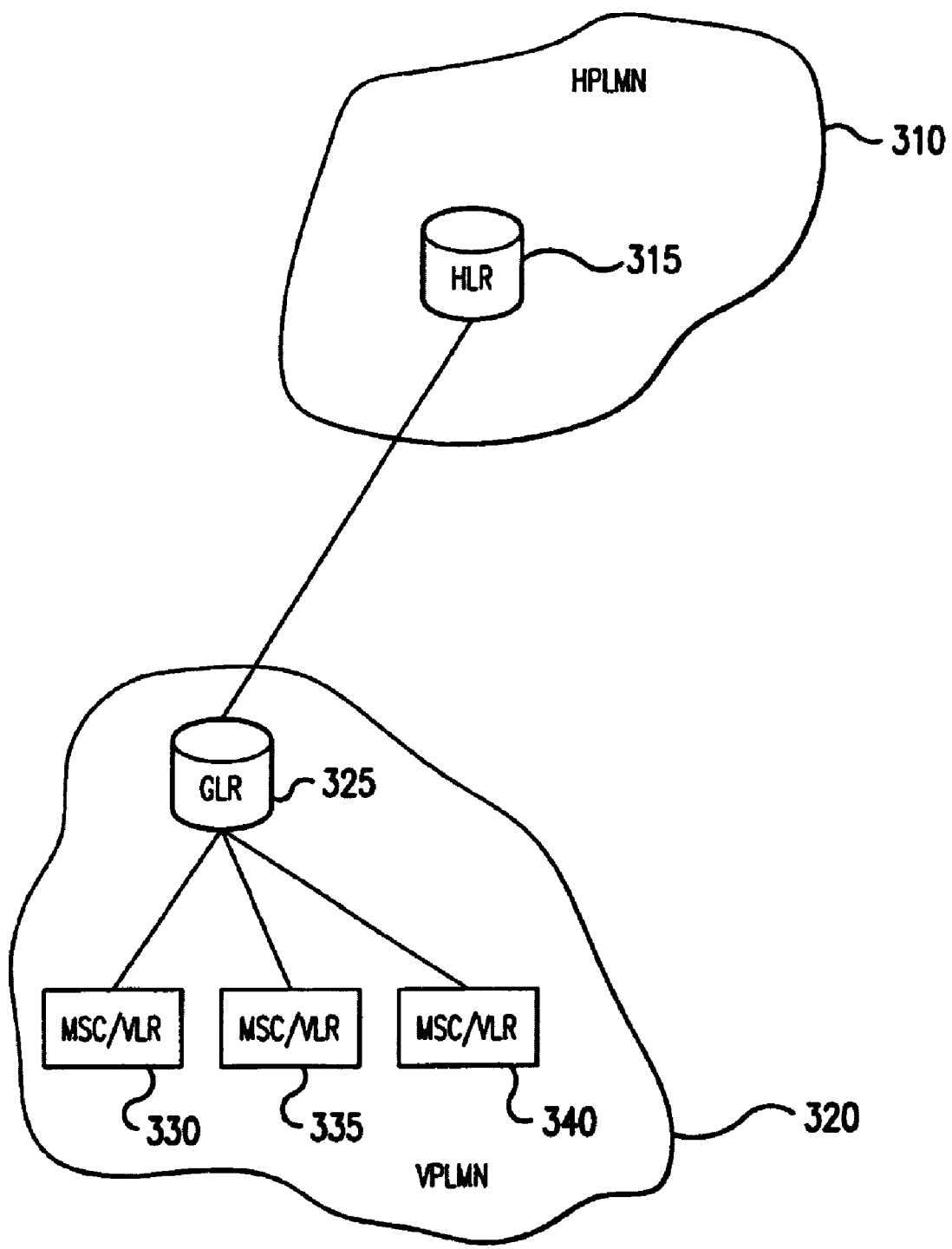
FIG. 3 illustrates an exemplary UMTS system which includes a GLR.
Figure 4:
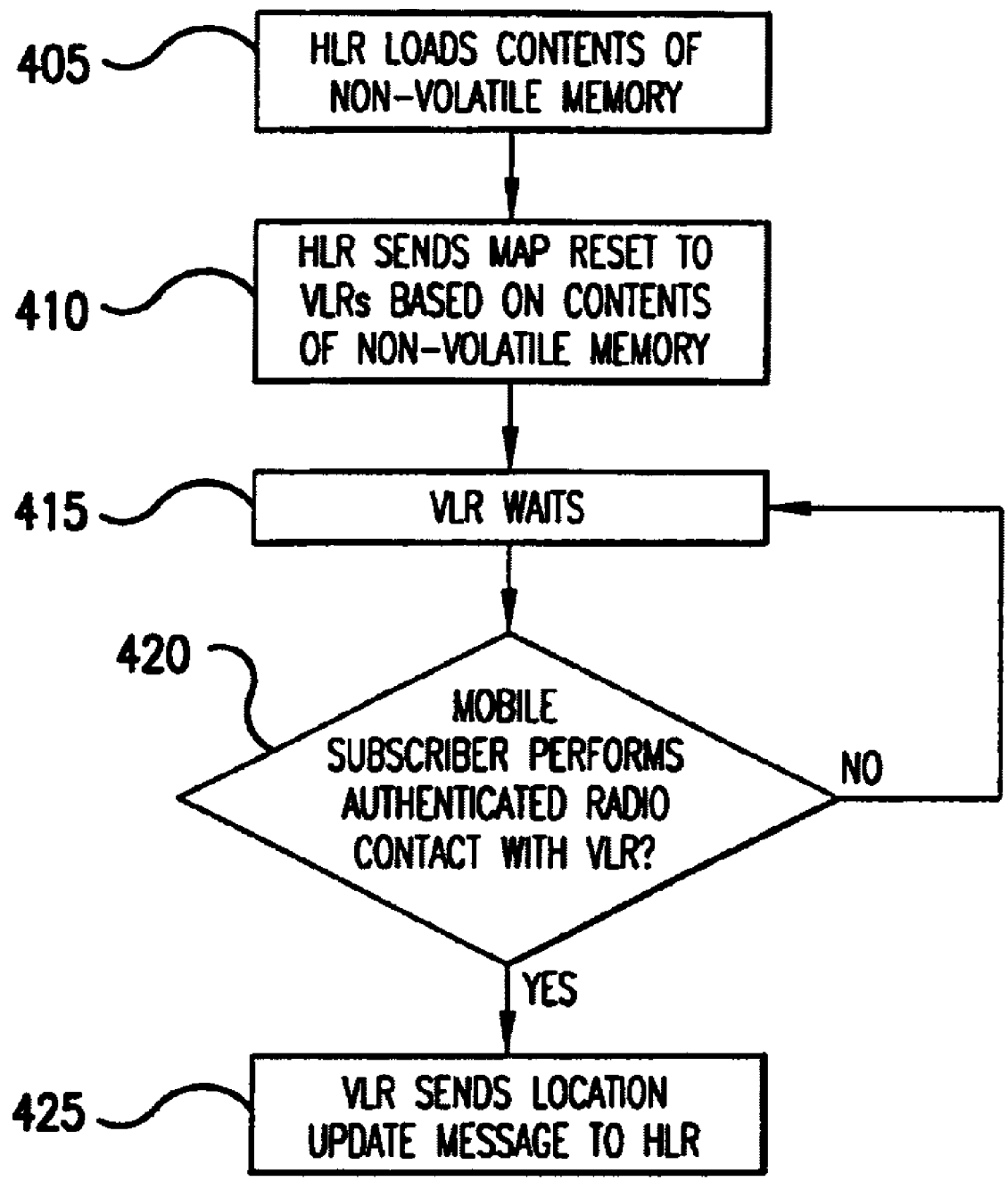
FIG. 4 is a signaling diagram of conventional MAP location updating procedures.
Figure 5:
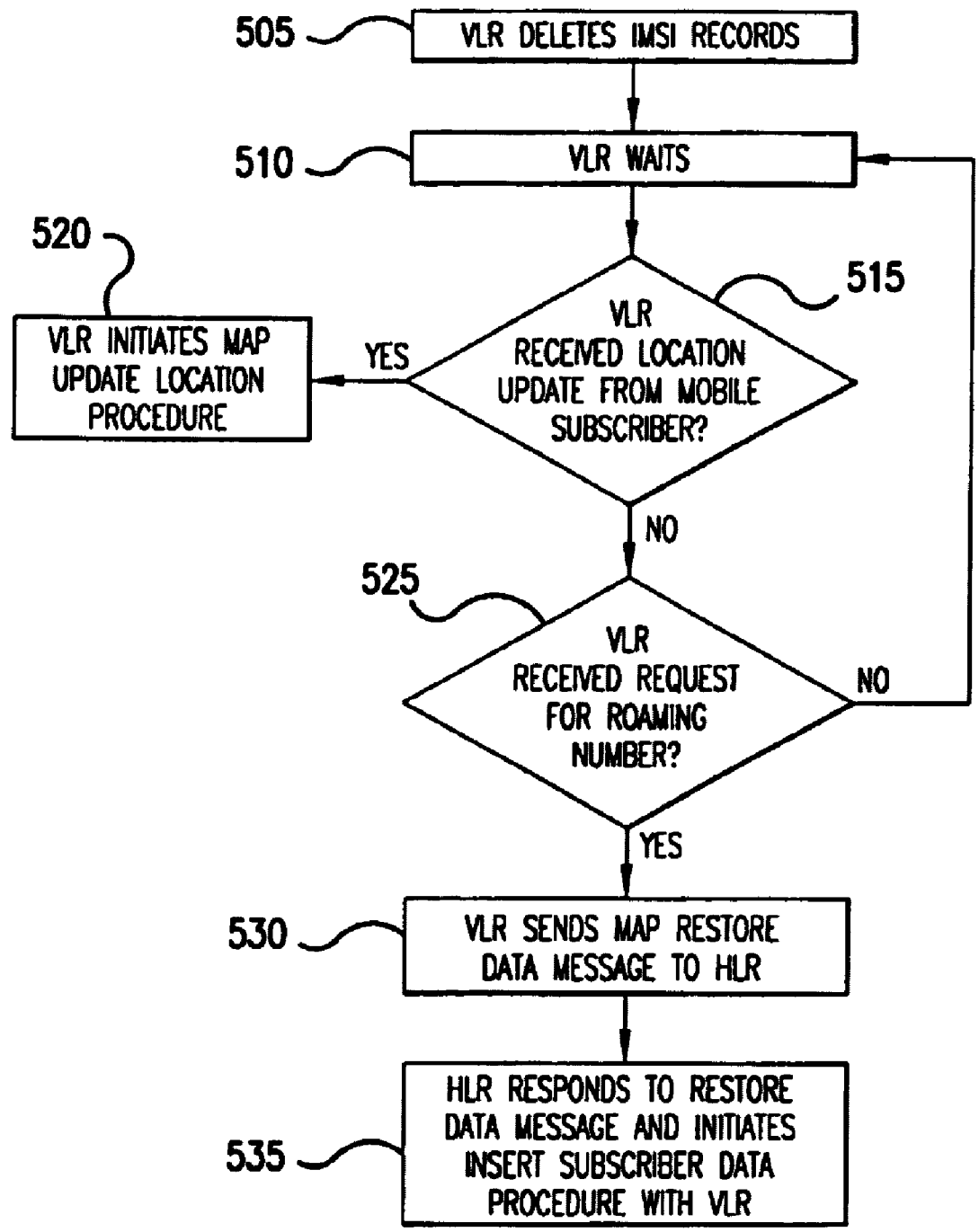
FIG. 5 illustrates a portion of a conventional MAP_INSERT_SUBSCRIBER_DATA message.
Figure 6:
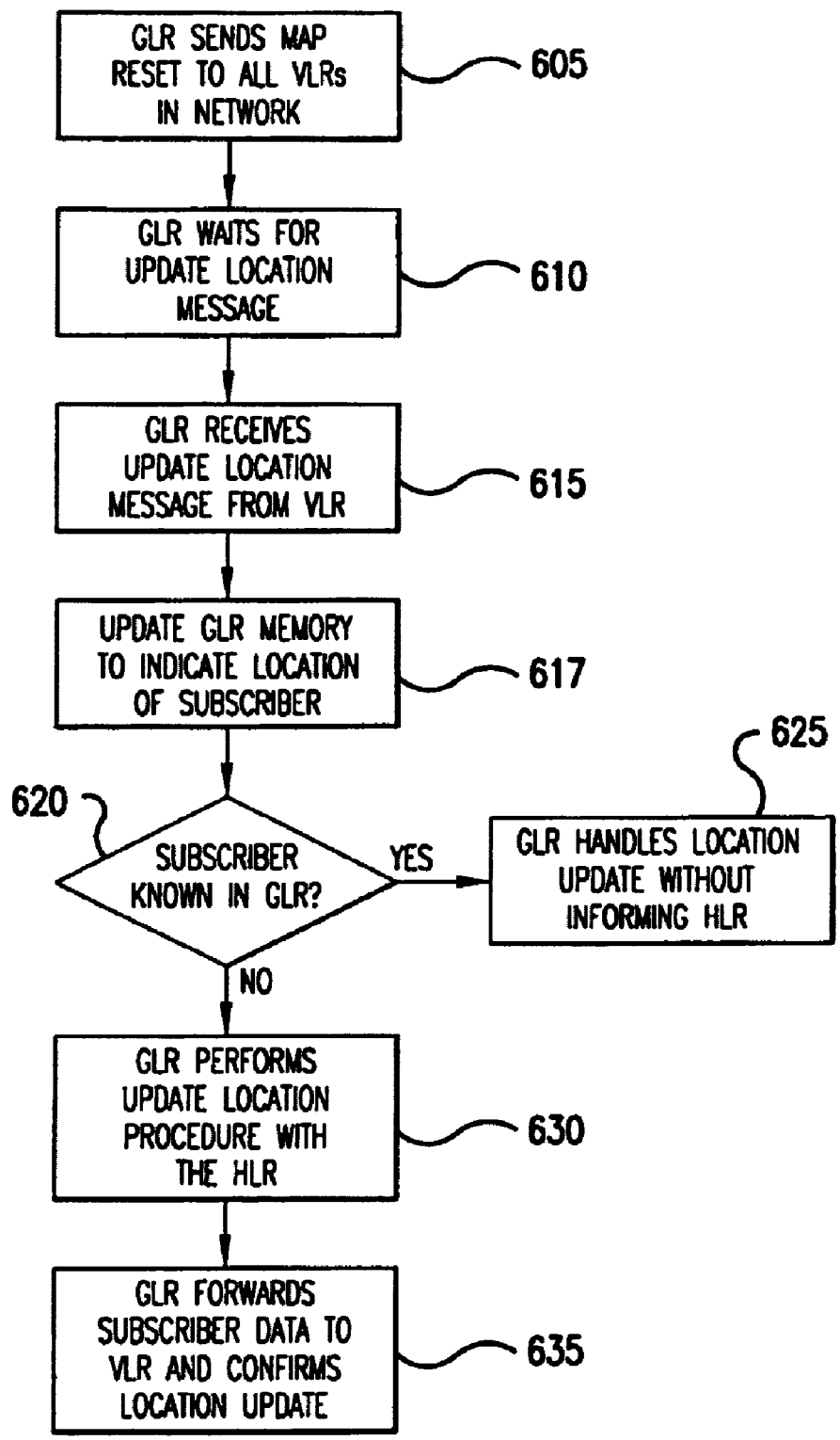
FIG. 6 illustrates a portion of a conventional MAP_INSERT_SUBSCRIBER_DATA response confirmation message.

In the following description, for purposes of explanation and not limitation, specific details are set forth, such as particular sequences of inter and intra network signaling, types of messages, etc. in order to provide a thorough understanding of the present invention. However, it will be apparent to one skilled in the art that the present invention may be practiced in other embodiments that depart from these specific details. In other instances, detailed descriptions of well-known methods, devices, and network elements are omitted so as not to obscure the description of the present invention.

The exemplary radio communication systems discussed herein are described as operating in accordance with the UMTS system, however, one skilled in the art will recognize that the present invention can be implemented in other mobile communications systems where a gateway is used to reduce internetwork signaling.

According to exemplary embodiments of the present invention the GLR detects when a piece of information required by the HLR is changed and then forwards the required information to the HLR. To detect when a piece of information is changed, due to a changed location of the mobile subscriber, the GLR stores the six parameters associated with the mobile subscriber's features (SS-Code List, Bearer Service List, Teleservice List, Operator Determined Barring General Data, Regional Subscription Response, Supported CAMEL Phases) received in the MAP_INSERT_SUBSCRIBER_DATA response message from the MSC/VLR. Since, with the exception of the indication of an entirely restricted MSC area, this is data characteristic to each node, the specific support for each feature in each node could also be stored in the GLR as configuration data. Configuration data stored in the GLR indicates the support for features that are not subscriber specific for each of the MSC/VLRs controlled by the GLR, e.g., support for operator determined barring is not subscriber specific whereas a restricted mobility area is subscriber specific.

When the next MAP_INSERT_SUBSCRIBER_DATA response message concerning the same mobile subscriber is received from a new MSC/VLR, the GLR determines whether any of the mobile subscriber's features has changed. The GLR can determine whether support for any of the mobile subscriber's features has changed by comparing the data received in the MAP_INSERT_SUBSCRIBER_DATA response message with the stored data from the previous MAP_INSERT_SUBSCRIBER_DATA response message for the concerned mobile subscriber. Alternatively, the GLR can make this determination by comparing the configuration data for the old and the new MSC/VLR node. Since an entirely restricted MSC area cannot be determined by configuration data, the GLR will need to determine for each MSC/VLR if the MSC/VLR area is restricted based on the information previously provided by the HLR or provided in the MAP_INSERT_SUBSCRIBER_DATA response message from the MSC/VLR. If support for the mobile subscriber's features has changed due to a mobile subscriber roaming from one MSC/VLR to another where both MSC/VLRs are served by the same GLR, the GLR informs the HLR in accordance with either of the following three alternative methods.

Figure 7:
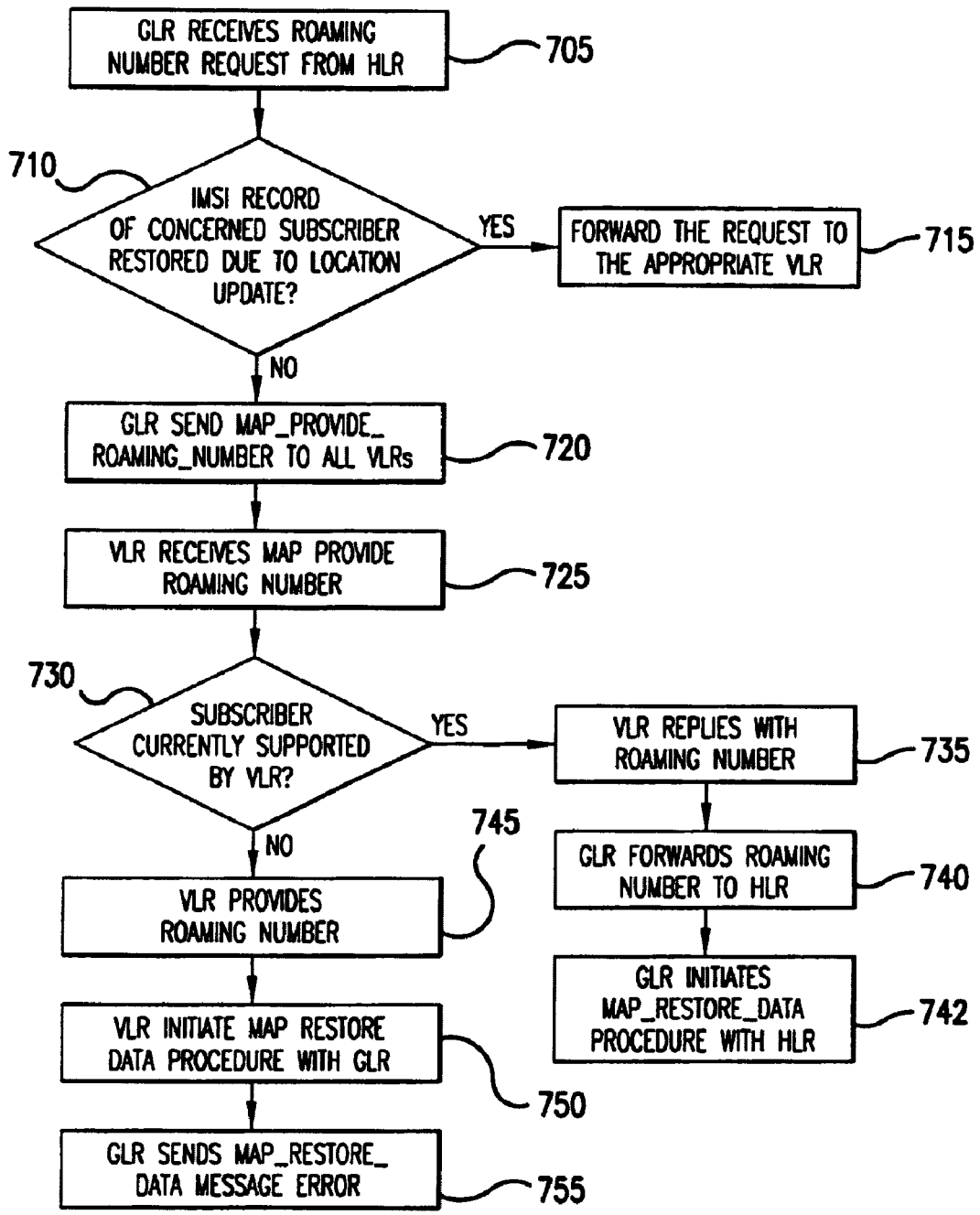
FIG. 7 is a signaling diagram of a location updating procedure in a UMTS-type system which in includes a GLR.
Figure 8:
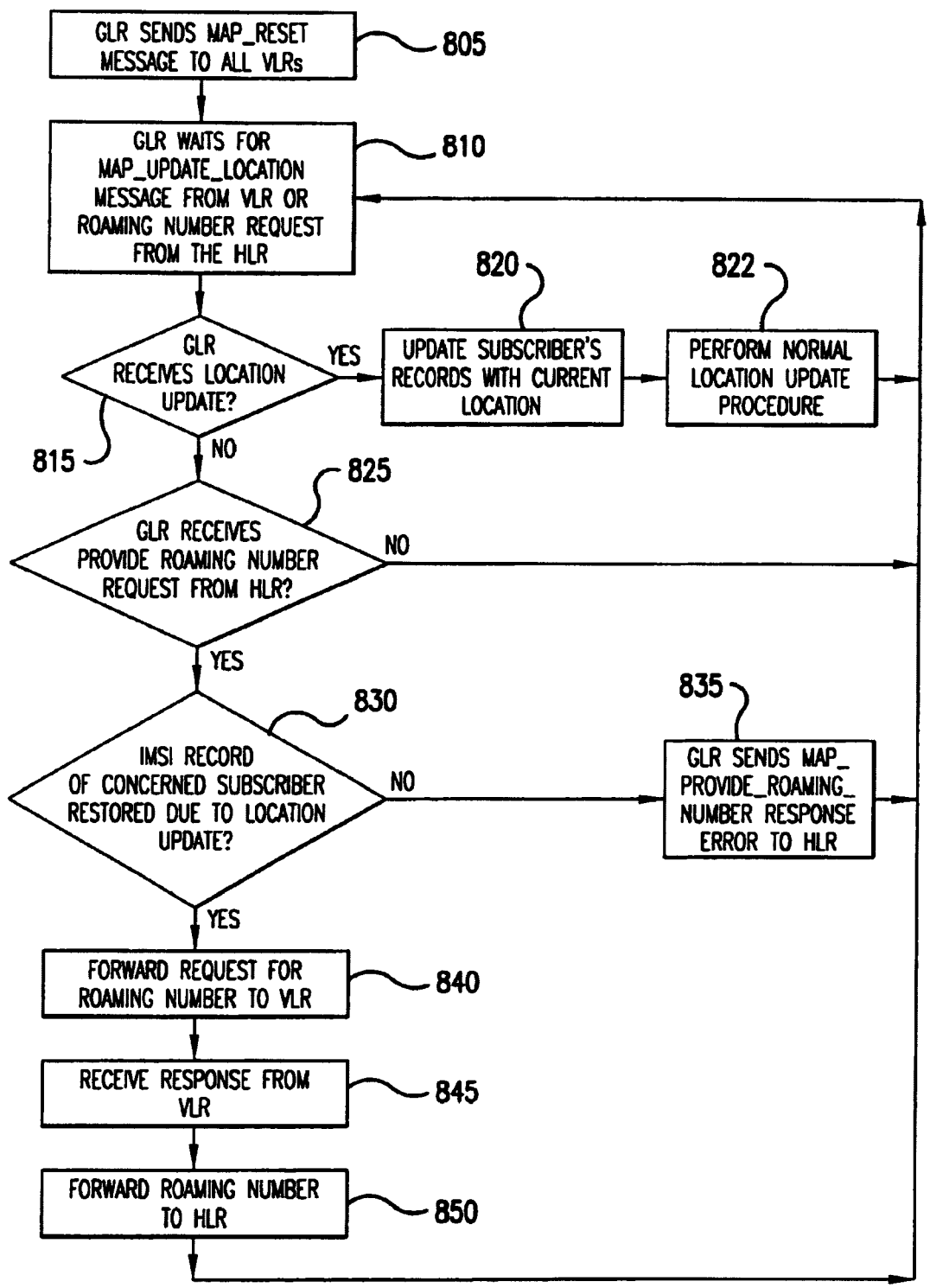
FIG. 8 is a signaling diagram of a location updating procedure in a UMTS-type system which includes a GLR in accordance with one embodiment of the present invention.

FIG. 8 illustrates the signaling for informing the HLR whether any of the essential information regarding the features provided to the roaming mobile subscriber has changed when the roaming mobile subscriber roams from one MSC/VLR to another where both MSC/VLRs are served by the same GLR. When a mobile subscriber has contacted an MSC/VLR and requested a location update, the MSC/VLR sends a MAP_UPDATE_LOCATION message to the GLR which responds with a MAP_INSERT_SUBSCRIBER_DATA message in a manner similar to that described above in connection with FIG. 7. If the MSC/VLR detects that certain features within the mobile subscriber profile are not supported and/or that the entire MSC area is restricted for the concerned mobile subscriber, the MSC/VLR responds with a MAP_INSERT_SUBSCRIBER_DATA message which indicates the features not supported by the MSC/VLR and/or that the entire MSC area is restricted. The GLR determines from the MAP_INSERT_SUBSCRIBER_DATA response message, or by comparing configuration data for the previous and the new MSC/VLR, whether support for any of the indicated features has changed when the mobile subscriber moved from the previous to the new MSC/VLR, or whether the entire MSC area was restricted in the previous MSC/VLR but not in the new MSC/VLR, or vice versa. If so, the GLR initiates a location updating procedure by sending a MAP_UPDATE_LOCATION message to the HLR. Since the GLR is used to reduce internetwork signaling, conventional systems would not initiate a location updating procedure with the HLR. Accordingly, conventional systems would not send the MAP_UPDATE_LOCATION message to the HLR when the MSC/VLR support for the mobile subscriber's features has changed nor when a mobile subscriber has moved from an entirely restricted MSC area to one that is not, or vice versa.

When the resulting MAP_INSERT_SUBSCRIBER_DATA message from the HLR is received, the GLR does not forward it to the MSC/VLR. Instead it responds to the HLR with the same MAP_INSERT_SUBSCRIBER_DATA response message that it received from the MSC/VLR indicating the features not supported by the MSC/VLR and/or that the entire MSC area is restricted. The HLR then responds with a MAP_UPDATE_LOCATION response confirmation. The GLR sends a MAP_UPDATE_LOCATION response confirmation to the MSC/VLR. Through this process, the HLR receives the information concerning features supported by the new MSC/VLR. Hence, the HLR can adjust the features which it is supporting for the mobile subscriber.

One skilled in the art will recognize that in certain scenarios the MAP_INSERT_SUBSCRIBER_DATA response message forwarded by the GLR will be an empty confirmation message. For example, when a mobile subscriber roams from an area where an MSC/VLR supports all of the mobile subscriber's features but is an entirely restricted MSC area to an MSC/VLR which also supports all of the mobile subscriber's features and is not an entirely restricted MSC area, the MAP_INSERT_SUBSCRIBER_DATA response message will be empty. Since the MAP_INSERT_SUBSCRIBER_DATA response message indicates features not supported and restricted MSC areas, an empty message indicates support for all mobile subscriber features and no restricted MSC areas.

Figure 9:
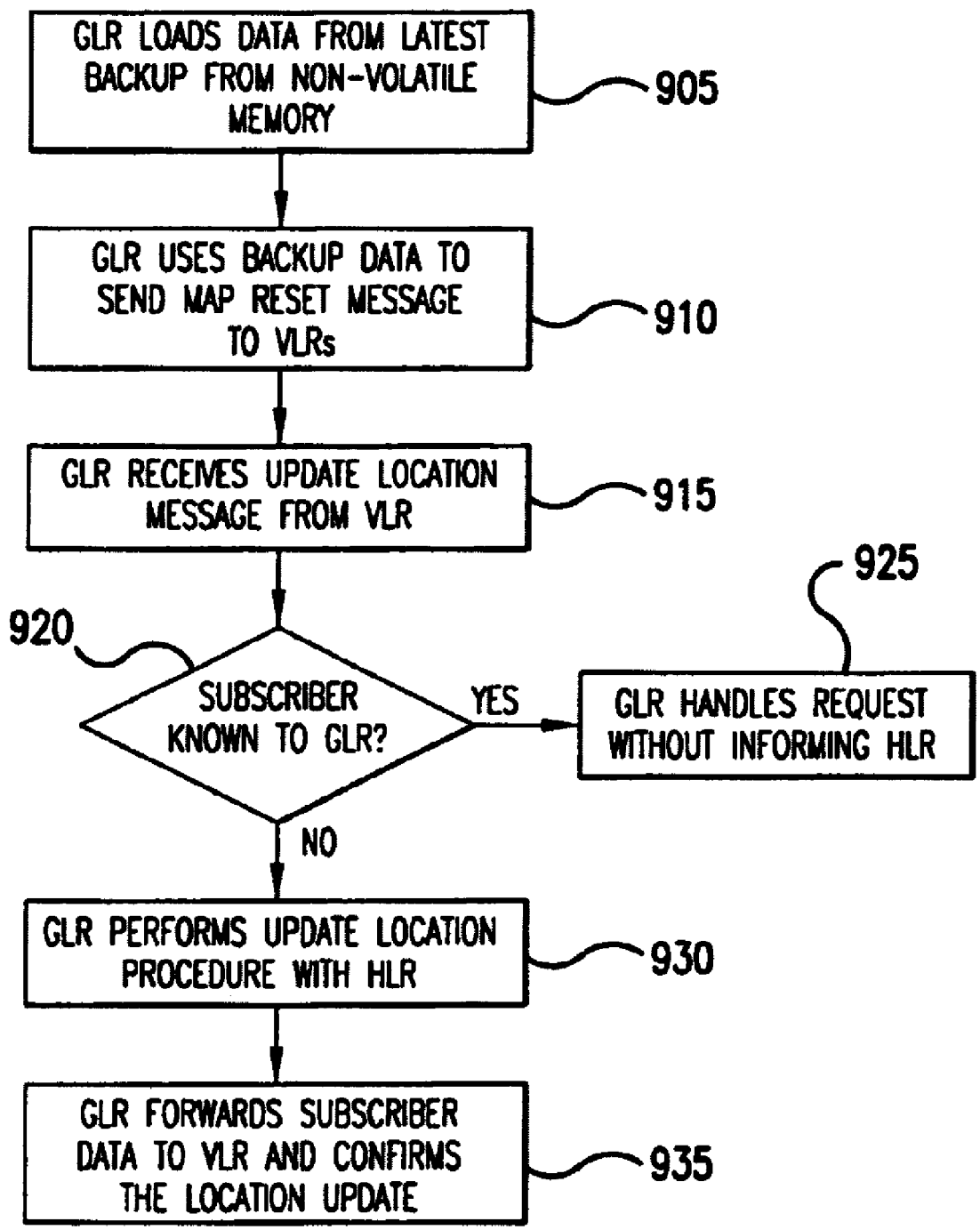
FIG. 9 is a signaling diagram of a location updating procedure in a UMTS-type system which includes a GLR in accordance with another embodiment of the present invention.

FIG. 9 illustrates the signaling for informing the HLR whether any of the essential information regarding the features provided to the roaming mobile subscriber has changed when the roaming mobile subscriber roams from one MSC/VLR to another, where both MSC/VLRs are served by the same GLR, in accordance with another embodiment of the present invention. The first three messages exchanged between the MSC/VLR and GLR are the same as those described above with regard to FIG. 8, where the MSC/VLR informs the GLR that certain features within the mobile subscriber profile are not supported by the MSC/VLR and/or that the entire MSC area is restricted for the concerned subscriber. In addition, the MAP_INSERT_SUBSCRIBER_DATA response message can be empty. The GLR determines from the MAP_INSERT_SUBSCRIBER_DATA response message, or by comparing configuration data for the previous and the new MSC/VLR, whether support for any of the indicated features has changed when the mobile subscriber moved from the previous to the new MSC/VLR, or whether the entire MSC area was restricted in the previous MSC/VLR but not in the new MSC/VLR, or vice versa. If there is a change in the support for the mobile subscriber's features or these is a change in an entirely restricted MSC area the GLR sends a MAP_RESTORE_DATA message to the HLR, although data restoration is not really needed.

Conventionally, the MAP_RESTORE_DATA message is sent from an MSC/VLR to an HLR when the MSC/VLR has experienced a fault which caused the MSC/VLR to lose the mobile subscriber's data. The MAP_RESTORE_DATA message will trigger a MAP_INSERT_SUBSCRIBER_DATA message to be sent from the HLR, and the GLR responds to this with the same MAP_INSERT_SUBSCRIBER_DATA response message that it received from the MSC/VLR, i.e., the MAP_INSERT_SUBSCRIBER_DATA message indicating features not supported by the MSC/VLR and/or that the entire MSC area is restricted for the concerned mobile subscriber, or an empty message. The HLR then sends a MAP_RESTORE_DATA response confirmation message to the GLR. The GLR completes the update location procedure with the MSC/VLR by sending a MAP_UPDATE_LOCATION response confirmation message.

In accordance with another embodiment of the present invention, a new MAP message is defined for informing the HLR of the changes in the support for the mobile subscriber's features and/or in the status of possible restriction of the entire MSC area. This message could, for example, be called MAP_INFORMATION_UPDATE and would include the IMSI of the concerned mobile subscriber (as well as the Invoke ID) as a mandatory parameter. The MAP_INFORMATION_UPDATE message can also include the SS-Code List, the Bearer Service List, the Teleservice List, the Operator Determined Barring General Data, the Regional Subscription Response and the Supported CAMEL Phases parameters as optional parameters for informing the HLR of changes in the support of these features and/or the status of possible restriction of the entire MSC area. The response message from the HLR would only contain the common parameters Invoke ID, User Error and Provider Error.

Figure 10:
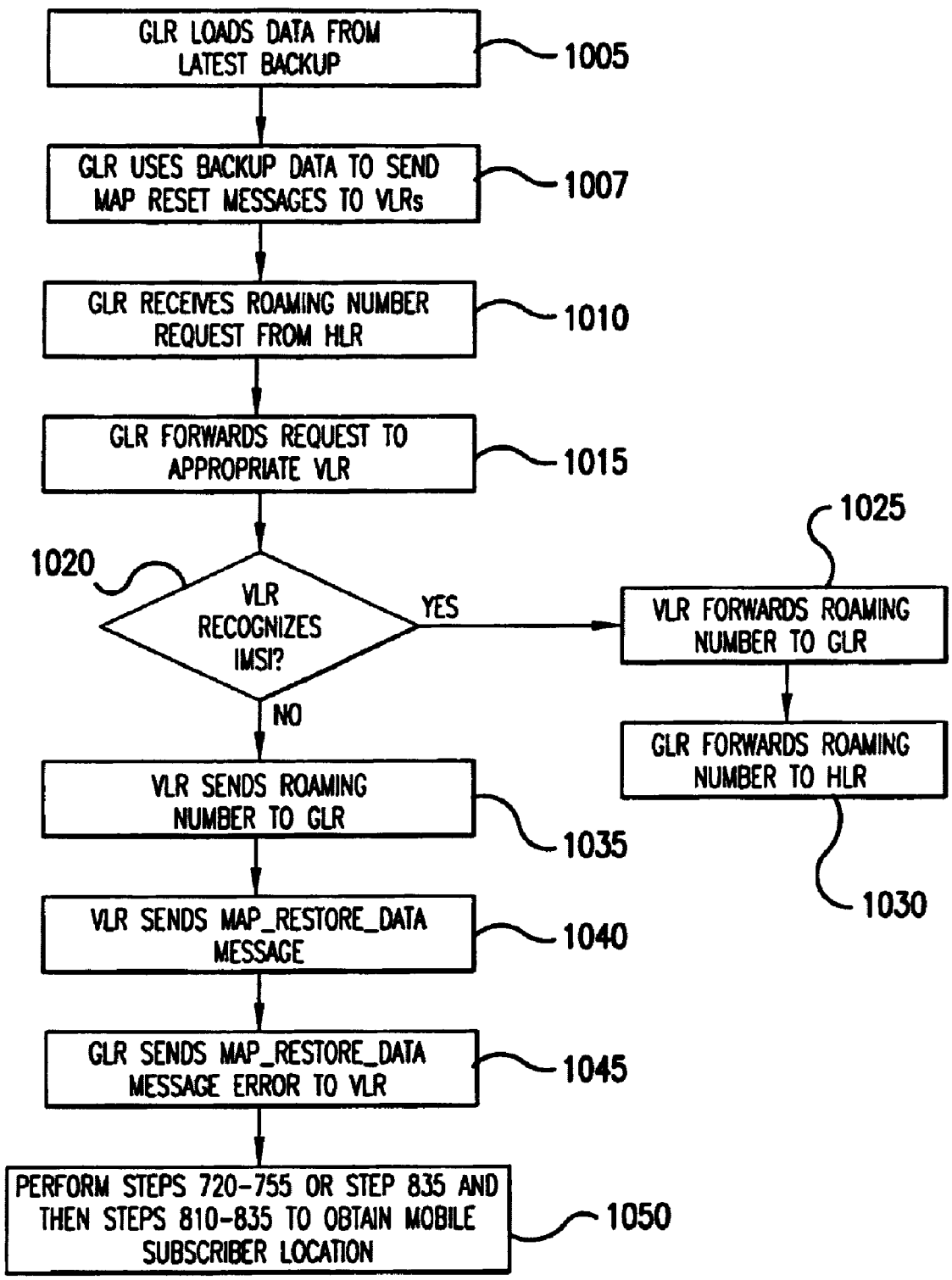
FIG. 10 is a signaling diagram of a location updating procedure in a UMTS-type system which includes a GLR in accordance with yet another embodiment of the present invention.

FIG. 10 illustrates the signaling for informing the HLR that support for the features provided to the roaming mobile subscriber has changed and/or that the status of possible restriction of the entire MSC area has changed when the roaming mobile subscriber roams from one MSC/VLR to another, where both MSC/VLRs are served by the same GLR, using the newly defined MAP message. Again, the first three messages exchanged between the MSC/VLR and GLR are similar to those described above with regard to FIG. 8. The GLR determines from the MAP_INSERT_SUBSCRIBER_DATA response message, or by comparing configuration data for the previous and the new MSC/VLR, whether the support for any of the indicated features has changed when the mobile subscriber moved from the previous to the new MSC/VLR, or whether the entire MSC area was restricted in the previous MSC/VLR but not in the new MSC/VLR, or vice versa. If so, the GLR then sends a MAP_INFORMATION UPDATE message to the HLR indicating the features not supported by the MSC/VLR and/or that the entire MSC area is restricted, or an empty message. In response the HLR sends a MAP_INFORMATION_UPDATE response confirmation message to the GLR. The GLR completes the location updating procedure by sending a MAP_UPDATE_LOCATION confirmation message to the MSC/VLR. By defining a new MAP message the signaling load on the system can be reduced since the transfer of the usually large MAP_INSERT_SUBSCRIBER_DATA message from the HLR to the GLR is avoided.

For ease of explanation exemplary embodiments have been described as informing the HLR of features not supported by the new MSC/VLR. Of course, one skilled in the art will recognize that the GLR by informing the HLR of features not supported by the new MSC/VLR, the GLR is implicitly indicating the features which are supported by the new MSC/VLR which were not supported by the previous MSC/VLR.

One skilled in the art will recognize that the described methods are equally applicable in a general packet radio service (GPRS) network. By informing the HLR of features not supported by a new serving GPRS support node (SGSN), the GLR implicitly indicates the features which are supported by the new SGSN, and vice versa. For a more detailed description of GPRS and SGSNs, the interested reader should refer to U.S. Patent Application No. 09/547,991 "Gateway Location Registers In A UMTS System" which is herein expressly incorporated by reference.

The present invention has been described by way of exemplary embodiments to which the invention is not limited. Modifications and changes will occur to those skilled in the art without departing from the spirit and scope of the invention as defined in the appended claims.

What is claimed is:

1. In a wireless communications system a method for indicating features not supported by visitor location registers comprising the steps of:
    sending, from a gateway location register associated with the wireless communication system to a home location register, a message including an indication of a feature not supported by a first visitor location register for a subscriber;
    sending, to the gateway location register, another message including another indication of a feature not supported by a second visitor location register for the subscriber; and
    determining, by the gateway location register, whether a feature supported by the first visitor location register is not supported by the second visitor location register or whether a feature supported by the second visitor location register is not supported by the first visitor location register.

2. The method of claim 1, wherein if the first visitor location register supports a feature not supported by the second visitor location register or if the second visitor location register supports a feature which is not supported by the first visitor location register, performing the step of:
    sending, from the gateway location register to the home location register, a third message including a third indication, wherein the third indication implicitly indicates the feature supported by the first visitor location register for the subscriber or the feature supported by the second visitor location register for the subscriber.

3. The method of claim 2, wherein the third message is sent to the home location register during a location updating message exchange.

4. The method of claim 3, wherein the location updating message exchange is initiated by the gateway location register sending a MAP_UPDATE_LOCATION message to the home location register.

5. The method of claim 4, wherein the third message is a MAP_INSERT_SUBSCRIBER_DATA response confirmation message.

6. The method of claim 2, wherein the third message is sent to the home location register during a fault restoration message exchange.

7. The method of claim 6, wherein the fault restoration message exchange is initiated by the gateway location register sending a MAP_RESTORE_DATA message to the home location register.

8. The method of claim 7, wherein the third message is a MAP_INSERT_SUBSCRIBER_DATA response confirmation message.

9. The method of claim 7, wherein the information updating message is a MAP_INFORMATION_UPDATE message.

10. The method of claim 2, wherein the third message is sent to the home location register in an information updating message.

11. The method of claim 1, wherein the another indication of a feature not supported is empty, thereby indicating that the second visitor location register supports all features for the subscriber.

12. The method of claim 1, wherein the message including the indication of the feature not supported by the first visitor location register is sent to the home location register during a location updating message exchange.

13. The method of claim 12, wherein the location updating message exchange is initiated by the gateway location register sending a MAP_UPDATE_LOCATION message to the home location register.

14. The method of claim 1, wherein the subscriber's features include:
    a supplementary service;
    a regional subscription service;
    a bearer service;
    operator determined barring;
    supported CAMEL phases; or
    a teleservice.

15. The method of claim 1, further comprising the steps of:
    determining whether the first visitor location register is located in an entirely restricted area or whether the second visitor location register is located in the entirely restricted area; and
    sending a third message including a third indication that the first visitor location register or the second visitor location register is located in the entirely restricted area if it is determined that the first visitor location register or the second visitor location register is located in the entirely restricted area.

16. A wireless communications system which indicates features not supported by visitor location registers, the wireless communication system comprising:
    a gateway location register for sending a message including an indication of a feature not supported by a first visitor location register for a subscriber to a home location register; and
    a second visitor location register for sending to the gateway location register, another message including another indication of a feature not supported by the second visitor location register for the subscriber,
    wherein the gateway location register determines whether a feature is supported by the first visitor location register which is not supported by the second visitor location register or whether a feature is supported by the second visitor location register which is not supported by the first visitor location register.

17. The system of claim 16, wherein if the first visitor location register supports a feature which is not supported by the second visitor location register or if the second visitor location register supports a feature which is not supported by the first visitor location register the gateway location register sends a third message to the home location register, the third message including a third indication, and the third indication implicitly indicates the feature supported by the first visitor location register or the feature supported by the second visitor location register for the subscriber.

18. The system of claim 17, wherein the third message is sent to the home location register during a location updating message exchange which is initiated by the gateway location register sending a MAP_UPDATE_LOCATION message to the home location register.

19. The system of claim 18, wherein the third message is a MAP_INSERT_SUBSCRIBER_DATA response confirmation message.

20. The system of claim 17, wherein the third message is sent to the home location register during a fault restoration message exchange which is initiated by the gateway location register sending a MAP_RESTORE_DATA message to the home location register.

21. The system of claim 20, wherein the third message is a MAP_INSERT_SUBSCRIBER_DATA response confirmation message.

22. The system of claim 21, wherein the information updating message is a MAP_INFORMATION_UPDATE message.

23. The system of claim 17, wherein the third message is sent to the home location register in an information updating message.

24. The system of claim 16, wherein the another indication of a feature not supported is empty, thereby indicating that the second visitor location register supports all features for the subscriber.

25. The system of claim 16, wherein the subscriber's feature includes one or more of:

a supplementary service;

a regional subscription service;

a bearer service;

operator determined barring;

supported CAMEL phases; or a teleservice.

26. The system of claim 16, wherein if it is that the first visitor location register is located in an entirely restricted area or that the second visitor location register is located in the entirely restricted area, the gateway location register sends a third message including a third indication that the first visitor location register or the second visitor location register is located in the entirely restricted area if it is determined that the first visitor location register or the second visitor location register is located in the entirely restricted area.

* * * * *